United States Patent [19]

Sherbanenko

[11] Patent Number: 4,585,655

[45] Date of Patent: Apr. 29, 1986

[54] METHOD FOR COLORING NATURAL CASINGS AND PRODUCT THEREOF

[76] Inventor: Mykola Sherbanenko, 3610 Evergreen La., Plymouth, Minn. 55441

[21] Appl. No.: 759,502

[22] Filed: Jul. 26, 1985

Related U.S. Application Data

[63] Continuation of Ser. No. 556,108, Nov. 29, 1983, abandoned.

[51] Int. Cl.$^4$ .................... A23L 1/275; A22C 13/00
[52] U.S. Cl. .................... 426/106; 426/140; 426/129; 426/112; 426/250; 206/802
[58] Field of Search ............ 426/250, 140, 138, 105, 426/92, 129, 112, 106; 206/802; 8/517, 504, 490, 404

[56] References Cited

U.S. PATENT DOCUMENTS

| | | | |
|---|---|---|---|
| 1,678,648 | 7/1928 | Replogle | 426/250 |
| 2,273,810 | 2/1942 | Adams | 426/140 |
| 2,360,374 | 10/1944 | Topjian | 426/140 |
| 2,477,768 | 8/1949 | Remer | 426/135 |
| 3,285,906 | 11/1966 | Kretlow | 426/540 |
| 3,567,467 | 3/1971 | Conly | 426/140 |
| 3,864,499 | 2/1975 | Turbak | 426/140 |
| 3,959,502 | 5/1976 | Vaessen | 426/140 |
| 3,961,085 | 6/1976 | Winkler | 426/140 |
| 4,061,786 | 12/1977 | Winkler | 426/140 |
| 4,196,220 | 4/1980 | Chiu et al. | 426/140 |

FOREIGN PATENT DOCUMENTS

| | | | |
|---|---|---|---|
| 151768 | 9/1950 | Australia | 426/135 |
| 480960 | 2/1952 | Canada | 426/140 |
| 731091 | 3/1966 | Canada | 426/135 |
| 2914529 | 10/1979 | Fed. Rep. of Germany | 426/105 |

OTHER PUBLICATIONS

Condensed Chem. Dict., 8th Ed., Hawley, Van Nostrand Reinhold, 1971.
CRC Handbook of Food Additives, Furia, 2nd Ed., vol. 1, CRC Press, 1972.
Chemicals Used in Food Processing, Natl. Acad. of Sciences, Publ. #1274, 1965.
Certified Food Colors, Warner Jenkinson, 1969.

*Primary Examiner*—Steven Weinstein
*Attorney, Agent, or Firm*—Malcolm Reid; Gerald Chernivec

[57] ABSTRACT

A composition, which when mixed with water, is capable of providing a colorant solution for coloring natural casings, comprising an effective amount of at least one antioxidant, an effective amount of a preservative capable of minimizing the deterioration of the casing, and a dye system for coloring the casing.

18 Claims, No Drawings

METHOD FOR COLORING NATURAL CASINGS AND PRODUCT THEREOF

This is a continuation application of Ser. No. 556,108, filed Nov. 29, 1983, now abandoned.

TECHNICAL FIELD

The invention relates to a composition, which when mixed with water, is capable of imparting a desired color to natural casings used in the production of food items such as sausages.

BACKGROUND ART

In the production of foodstuffs such as sausage and frankfurters (commonly known as hot dogs) a casing is typically utilized. Such casings can be natural, i.e., obtained from the intestines of various edible animals, such as cattle and sheep, or synthetic. Prior to about 1925, substantially all sausage casings were natural casings prepared from animal intestines. While numerous types of synthetic casings have been developed since that time, natural casings still remain the "elite" of the sausage industry.

In sausage processing using natural casings, an emulsion, which is basically meat, is conventionally chopped, ground, emulsified and mixed with appropriate seasonings. This emulsion is then stuffed into the natural casings, following which the sausage is linked or tied, placed on smokehouse racks and allowed to remain therein for a period of time during which coloring and curing occurs. (Special heating ovens can also be used in place of smokehouses.) After curing of the sausage has occurred, same can then be cooked in water or steam followed by cooling.

Natural casings made from intestines of animals are typically white in color, which is unacceptable to the average consumer. Accordingly, during the smoking process, sufficient wood or liquid smoke is allowed to penetrate the casing to color same. This is currently one well known manner to provide color to natural casings. In this instance, a smokehouse, with its attendant requirements for liquid smoke or sawdust, and its air pollution problems, is required for coloring the casings.

I have now found a simple composition, which, when mixed with water, is capable of providing a solution for imparting color to natural casings, thus eliminating entirely the necessity for smoking, or substantially reducing the time necessary for the smoking operation, if curing or smoking is required. Furthermore, in the area of the preparation of items such as hot dogs, my composition will allow for the formation of a natural casing with a red color. The colored casing can be conveniently transported in an aqueous solution of the composition in the absence of air.

DISCLOSURE OF THE INVENTION

In accordance with the invention there is provided a composition, which when mixed with water affords a solution capable of coloring natural casings, comprising an effective amount of a preservative for minimizing deterioration of the casing, an effective amount of an antioxidant, and an effective amount of an acceptable dye system for coloring the casing.

The invention also allows for packaging of natural casings in the solution for shipment to sausage manufacturers.

In the manner provided by the invention, the use of smokehouses and liquid smoke products and their attendant problems can be reduced, or in some cases, eliminated.

DISCLOSURE OF PREFERRED EMBODIMENTS

The basic composition of my invention comprises at least one preservative, at least one antioxidant and a dye system. Obviously, items which are acceptable pursuant Food and Drug Administration (FDA) guidelines, rules and regulations are an absolute necessity. Preservatives are capable of preventing the deterioration and spoilage of natural casings due to the presence of enzymes in the natural tissue and the invasion thereof by microorganisms. One of the most economical and ancient of preservatives is salt, e.g., sodium chloride. Accordingly, such is the most preferred preservative in the composition of my invention.

I have found that between about one and about two pounds of salt per ten pounds of water will provide satisfactory preservative characteristics in my invention. However, a salt concentration up to the limits of saturation is functional, albeit unnecessary and uneconomical.

The second component necessary in the composition of my invention includes at least one antioxidant. Antioxidants are utilized to minimize the development of rancidity in foods containing oils or fats, as would be typical with natural casings. Rancidity is typically due to oxidation based on the formation of peroxides at the double bonds of fat molecules with the subsequent breakdown of these peroxides to form aldehydes, ketones and acids of lower molecular weight. A preferred antioxidant is sodium erythorbate, although others are commercially available and have utility herein.

The antioxidant should be present at an effective amount, typically from about one ounce to about two ounces per ten pounds of water used to make the colorant solution.

In addition to the foregoing, compounds which are known as "synergists", have utility herein. Such materials typically have some antioxidant activity of their own, but they also have the ability to provide enhanced effect when added with other known antioxidants. An example of same is citric acid. I have found that up to about two ounces of such a synergist provides enhanced effect to my composition.

The dyes utilized in my invention are those specifically approved by the FDA and examples include FDA Red. No. 40 and FDA Red No. 3, specifically chosen due to the inherent properties thereof relative to providing specific desired coloration to the natural casings. In the case of a brown coloration requirement, an FDA Yellow dye, such as FDA Yellow No. 5 can be added to the red dyes noted above, the combination thereof providing the desired color of brown to natural casings. Other selections can provide equally beneficial results in accordance with the end color desired.

The concentration of dye chosen should be that sufficient to provide effective coloration, as desired, to the casing.

The dyes enumerated above are typically oil soluble, and thus it is conventionally necessary to add a component which is capable of solubilizing the dyes, and yet is totally miscible with water. An exemplary material is propylene glycol, which is non-toxic, completely miscible with water, and conventionally utilized with dye materials contained in food products. Fom about 0.2 to about 1.5 ounces of such a solubilizing agent per ten pounds of water have been found effective.

In addition to the foregoing, a compound capable of preserving the coloration of the casing is desirable. An example of such a compound is propylparaben.

I have found that from about 0.1 ounce per gallon of solution up to about 5 percent by weight thereof is effective to provide color perservation.

In using the compositions of my invention, same are typically mixed with water thoroughly, following which the solution is flushed through each natural casing until the desired coloration is achieved. The colored natural casing can then be placed with solution in a container such as a polyethylene bag, the bag then evacuated to remove all oxygen, and sealed, such as by a conventional heat seal. This allows the maintenance of a soft condition of the natural casing and additionally allows permeation of the dye solution throughout the sidewalls of the natural casing. The casing can then be shipped to a sausage manufacturer for further processing.

To further illustrate my invention in the form of examples, none of which should be considered limiting, the following are supplied, wherein all parts are by weight unless otherwise specified.

EXAMPLE 1

The following components are mixed together:

| Component | Parts |
|---|---|
| salt (NaCl) | 88.72 |
| sodium erythorbate | 8.97 |
| propylene glycol | 1.80 |
| FDA Red #40 | 0.40 |
| FDA Red #3 | 0.04 |
| citric acid | 0.07 |

The ingredients are then mixed with ten pounds of water for three minutes until completely dissolved, following which 0.1 percent by weight of propylparaben is added. Each casing desired to be treated is flushed from the inside with the aqueous solution, whereupon the interior walls of the casing absorb the colorant. The casings and solution are then placed into a polyethylene pouch, which is then evacuated and heat sealed for storage. The evacuation and heat sealing process maximizes the ability of each casing to remain soft and also allows permeation of the colored solution through to the outside casing surface to optimize the color thereof.

EXAMPLE 2

To provide a composition capable of imparting a brown color to the natural casings discussed herein, the following mixture is prepared:

| Component | Parts |
|---|---|
| salt (NaCl) | 88.21 |
| sodium erythorbate | 8.97 |
| propylene glycol | 2.27 |
| FDA Red #40 | 0.23 |
| FDA Red #3 | 0.02 |
| citric acid | 0.07 |
| FDA Yellow #5 | .23 |

This mixture was then mixed with ten pounds of water for a period of approximately three minutes following which the insides of natural casings were flushed therewith, imparting a brown color thereto. Solution and the natural casing were then inserted into a polyethylene pouch, evacuated and heat sealed. The casing was colored satisfactorily, and the necessity of liquid smoke to impart color thereto was avoided.

What is claimed is:

1. A package comprising a sealed, vacuum packed receptacle having the air removed therefrom and containing at least one colored natural casing wherein said at least one casing prior to vacuum packaging having been previously colored by being flushed from the inside with an aqueous solution such that the interior walls of the casing absorb the color; said aqueous solution comprising an effective amount of at least one antioxidant, an effective amount of a preservative capable of minimizing the deterioration of said at least one packaged casing, and an effective amount of an edible dye system for coloring the casing; said sealed vacuum packed receptacle containing said at least one colored natural casing in said aqueous solution sufficient to maximize the ability of said at least one casing to remain soft and to allow permeation of said aqueous solution through to the outside casing surface to optimize the color thereof.

2. The article of claim 1 wherein said preservative is sodium chloride.

3. The article of claim 1 wherein said preservative is present at a concentration of from about 1 to about 2 pounds per 10 pounds of water.

4. The article of claim 1 wherein said antioxidant is sodium erythorbate.

5. The article of claim 1 wherein said antioxidant is present at a concentration of from about 1 to about 2 ounces per 10 pounds of water.

6. The article of claim 1 additionally containing an effective amount of a water miscible solvent for said dye.

7. The article of claim 1 additionally containing an effective amount of a color preservative for maintaining the color of said casing.

8. The article of claim 1 additionally containing an effective amount of a synergist capable of providing enhanced antioxidant benefit.

9. The article of claim 8 wherein said synergist is citric acid.

10. A process for coloring natural casings and preserving same comprising:

(a) coloring said casings by flushing from the inside each of said casings with an aqueous solution comprising an effective amount of at least one antioxidant, an effective amount of a preservative capable of minimizing the deterioration of said casings, and an effective amount of an edible dye system capable of coloring said casings to a desired color, for a sufficient time to color at least the interior wall surface of said casings;

(b) placing at least one of said colored casings and at least a portion of said solution in a container capable of storing said colored casing and said solution;

(c) evacuating the air from said container; and (d) then sealing said air evacuated container sufficiently to prevent the ingress of air thereinto, said sealed, evacuated container containing said at least one colored natural casing in said aqueous solution sufficient to maximize the ability of said at least one casing to remain soft and to allow permeation of said solution through to the outside casing surface to optimize the color thereof.

11. The solution of claim 10 wherein said preservative is sodium chloride.

12. The solution of claim 10 wherein said preservative is present at a concentration of from about 1 to about 2 pounds per 10 pounds of water.

13. The solution of claim 10 wherein said antioxidant is sodium erythorbate.

14. The solution of claim 10 wherein said antioxidant is present at a concentration of from about 1 to about 2 ounces per 10 pounds of water.

15. The solution of claim 10 additionally containing an effective amount of a water miscible solvent for said dye system.

16. The solution of claim 10 additionally containing an effective amount of a color preservative for maintaining the color of said casings.

17. The solution of claim 10 additionally containing an effective amount of a synergist capable of providing enhanced antioxidant benefit.

18. The solution of claim 17 wherein said synergist is citric acid.

* * * * *